R. S. SWINTON.
MANUFACTURE OF VOLATILE ORGANIC ACIDS FROM THEIR CALCIUM SALTS.
APPLICATION FILED JAN. 20, 1911.
1,023,281.
Patented Apr. 16, 1912.
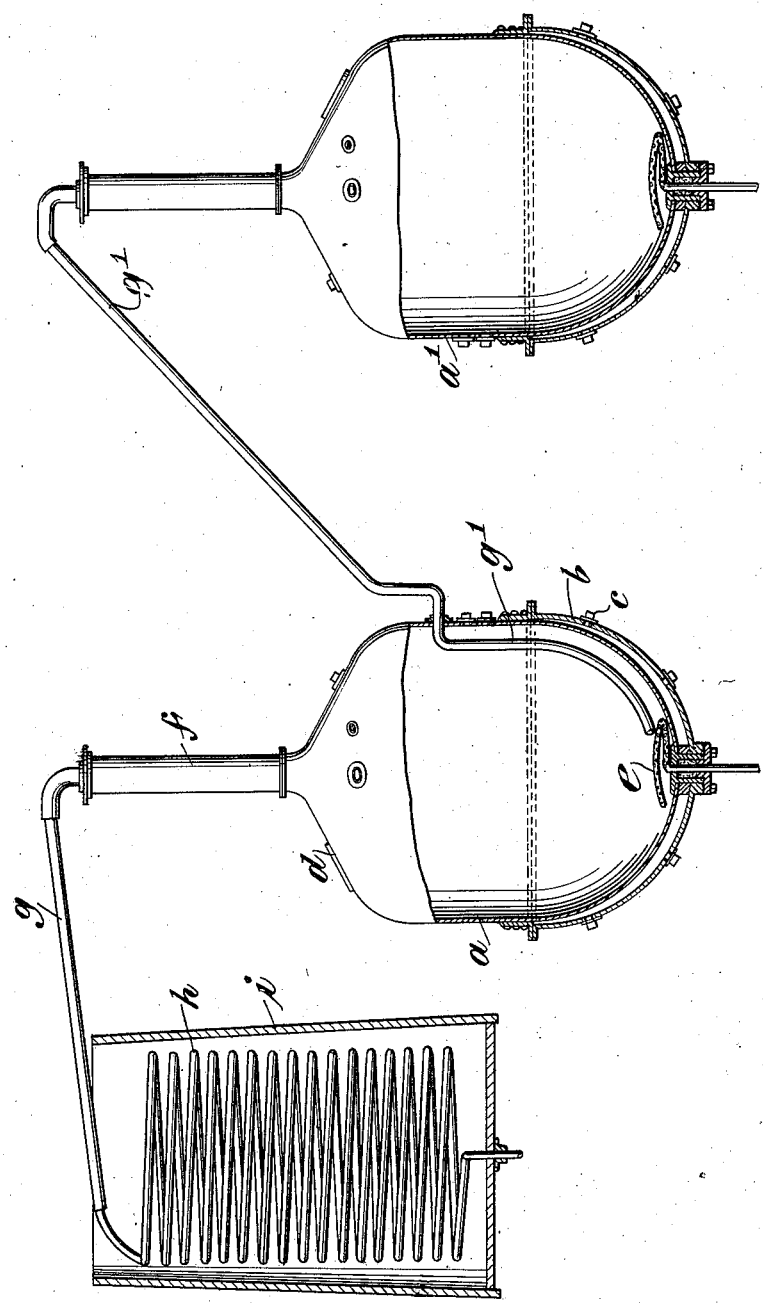

UNITED STATES PATENT OFFICE.

RALPH STOTT SWINTON, OF LINDEN, NEW JERSEY, ASSIGNOR TO W. J. BUSH & CO., INCORPORATED, OF DOVER, DELAWARE, A CORPORATION OF DELAWARE.

MANUFACTURE OF VOLATILE ORGANIC ACIDS FROM THEIR CALCIUM SALTS.

1,023,281.  Specification of Letters Patent.  Patented Apr. 16, 1912.

Application filed January 20, 1911. Serial No. 603,724.

*To all whom it may concern:*

Be it known that I, RALPH STOTT SWINTON, a subject of the King of Great Britain, residing in Linden, in the State of New Jersey, have invented certain new and useful Improvements in the Manufacture of Volatile Organic Acids from Their Calcium Salts, of which the following is a specification, reference being had to the accompanying drawing, forming a part hereof.

In the manufacture of volatile organic acids, such as acetic acid, from their calcium salts by reaction with sulfuric acid, for example, as sometimes carried on, the sulfuric acid is diluted with water to such an extent that the entire quantity of calcium salt employed, such as calcium acetate, can be mixed with the liquid to form a semi-liquid or pasty mass, so that the reaction shall take place at the same time throughout the entire mass. Whatever water is thus added is necessarily distilled over and dilutes the product and must be eliminated. Furthermore, whatever be the quantity of water added, the usual procedure is first to place the calcium salt in the still and then to add the sulfuric acid, thoroughly mixing the two. Such mixing is difficult to effect because the mass becomes almost solid, and requires mechanical agitators or stirrers, which, in turn, require considerable power to operate them and therefore involve expense in the manufacture. The necessity of using mechanical stirrers or agitators also places a limit on the quantity of material which it is practicable to handle in one charge. Again, unless the manufacture is carried on *in vacuo*, with the attendant expense in plant and in operation, it has been necessary to employ great external heat, usually fire heat, to carry on the reaction and distil off the acid liberated, with the results that through local overheating or charring there are secondary reactions which give rise to impurities in the finished product, and that noxious vapors are generated which are very injurious to the health of the workmen and render it undesirable to carry on the manufacture in the vicinity of inhabited houses, while the development of the heat required adds to the expense of manufacture. Again, the great heat employed makes it necessary to cool off the still for several hours before it can be opened, so that, unless the residue is conveyed to a closed chamber where it can cool off, there is a considerable loss of time in the use of a still. Furthermore, the addition of acid to the calcium salt often results in the formation of hard lumps which offer great resistance to the operation of the mechanical stirrers employed, while the existence of such hard lumps and the solidification of the mass in the still requires the expenditure of much labor in clearing out the still and preparing it for another charge. Still, again, the employment of great heat, in combination with the powerful reaction in the still, results in the rapid destruction of the apparatus employed, not only of the still itself, but also of the mechanical stirrers or agitators, which endure the heat and the action of the powerful acids but a short time.

There are, therefore, many objectionable features necessarily incident to the processes of manufacture as hitherto carried on and referred to herein, but these may be overcome or reduced by the present invention, by which the reaction between the calcium salt and the sulfuric acid is carried on gradually and progressively, at a comparatively low temperature and with a minimum of water, the calcium salt, in a dry and granular condition, being superimposed in the still above the acid, so that the reaction begins at the bottom and gradually progresses through the entire mass, the calcium salt gradually subsiding as the reaction progresses and offering no obstruction to the passage through it of the vapors from the points where the reaction is most active.

It may be desirable in order to prevent a too violent reaction at the beginning, to add to the commercial acid employed a small proportion of water, depending, however, upon the strength of the acid. It may also be desirable to mix a small portion of the calcium salt with the acid in the bottom of the still, to form a thin, semi-liquid mass, before the remainder of the calcium salt is introduced into the still, or to introduce acid in some way at the bottom of the still to semi-liquefy a small portion of the calcium salt. It is essential to provide for the continuous introduction, at a point or points near the bottom of the still, of steam, to bring about a complete and gradual reaction at a comparatively low temperature, and in order that there may be no condensation of such steam within the still, it is desirable also to apply externally a moderate heat, as by the use of a steam jacket, or to insulate at least the lower portion of the still by some suitable material to avoid excessive loss of the heat developed by the reaction and introduced by the steam.

It will be obvious that the improved process can be carried out in any suitable form of apparatus and that the invention is not in any way limited to the apparatus employed; nevertheless, in order that the invention may be understood readily there is shown in the single figure of the accompanying drawing, partly in elevation and partly in section, one form of apparatus in which the invention can be practiced.

The apparatus shown in the drawing comprises a still $a$ of any usual or suitable construction, the lower portion of which is preferably jacketed, as at $b$, the jacket space being provided with a steam connection, as at $c$, and otherwise constructed in any usual or suitable manner. The still is further provided in its upper part with a manhole, as at $d$, through which the calcium salt may be introduced, and with means, such as a perforated steam coil $e$, through which steam may be introduced at the bottom of the still. The neck $f$ of the still is connected by a suitable pipe $g$ with a worm $h$ located in a tank $i$, the vapors being condensed in the usual manner in the worm while the condensed liquid is discharged at the extremity thereof.

If it should be found that the vapors which pass off from a single still are not sufficiently strong, two or more stills may be arranged in series, as shown in the drawing, the vapors from the still $a'$ being conducted by a tube $g'$ to the bottom of the still $a$ where they may be used in place of steam alone in the first still for the purpose of establishing the reaction therein.

In practicing the invention with such apparatus as that shown in the drawing, the still or each still is first charged with a small portion of the calcium salt, say to about one-sixth of its capacity, and sulfuric acid, either with or without water as conditions may require, is added so as to form with the calcium salt a semi-liquid mass. The amount of water employed is small, usually varying from five to fifteen percentum of the weight of the sulfuric acid employed. The still is then filled up with the dry, granular calcium salt, which is thus superimposed, in the still, upon the acid. Steam, which need not be at a high temperature, is then turned on through the perforated coil $e$. This produces a slight effervescence which rises through the superimposed mass of dry, granular calcium salt until a reaction of the entire mass with the acid is obtained. The reaction thus begins at the bottom and gradually progresses throughout the mass, the calcium salt gradually subsiding and offering no obstruction to the passage through it of the vapors from the lower part of the still where the reaction is most active. The vapors pass off from the top of the still and are condensed in the usual way. The residual mass of calcium sulfate left in the still after the acetic acid has been distilled off, is of a thick, pasty consistency, containing a very small proportion of water and no hard lumps of gypsum. It therefore becomes possible, after the reaction has ceased, to add to this pasty mass sufficient water to liquefy it so that it can be blown out into a suitable receptacle at a great saving in labor cost over the usual method of shoveling out solid gypsum. If two or more stills are used in series, as shown, the heat and pressure of the vapors which pass off from the first still, wherein the reaction is commenced by the use of steam, start the reaction in the second still, so that a more concentrated vapor is obtained from the second still, and so on from each successive still. It will be understood that in any case it is possible to control the reaction by regulating the admission of steam to the bottom of the still. Moderate heat may be applied externally to the still, by means of the steam jacket $b$, in order to prevent the condensation of steam within the still, or, to the same end, the lower part of the still may be insulated, as by the jacket $b$ without the use of steam, in order to prevent the loss of heat developed by the reaction and produced by the steam which is introduced within the still.

The temperature in the still during the reaction usually varies from about 100 degrees C. to about 130 degrees C. or somewhat higher, which temperature is very much lower than that which is developed in the usual method of distillation by fire heat.

It will be found that the manufacture of acetic or other similar acid in accordance with the invention not only results in great economy in manufacture as compared with the methods commonly used, but insures a large yield and a product of great purity and high strength which requires practically no after treatment to prepare it for the market. Furthermore, as will be seen, the process lends itself readily to series operation with further economy in fuel and labor and the production, in a single continuous operation, of an acid of still greater purity and higher strength.

I claim as my invention:

1. The improvement in the process of manufacturing volatile organic acids from their calcium salts by the use of sulfuric acid, which consists in subjecting the dry, granular calcium salt to the continuous progressive action, from the bottom upward, of sulfuric acid.

2. The improvement in the process of manufacturing volatile organic acids from their calcium salts by the use of sulfuric acid, which consists in superimposing the dry, granular calcium salt in a still above the sulfuric acid and subjecting the same to the continuous progressive action, from the bottom upward throughout the mass, of sulfuric acid.

3. The improvement in the process of manufacturing volatile organic acids from their calcium salts by the use of sulfuric acid, which consists in mixing a small portion of the calcium salt with the acid in the bottom of the still to form a semi-liquid mass, and then superimposing the remainder of the charge of calcium salt in a dry, granular condition above the semi-liquid mass, so that the reaction begins at the bottom and gradually progresses through the mass.

4. The improvement in the process of manufacturing volatile organic acids from their calcium salts by the use of sulfuric acid, which consists in superimposing the calcium salt in a dry, granular condition above the acid in the still and continuously introducing steam at the bottom of the still so that the reaction begins at the bottom and gradually progresses throughout the mass.

5. The improvement in the process of manufacturing volatile organic acids from their calcium salts by the use of sulfuric acid, which consists in superimposing the calcium salt in a dry, granular condition above the acid in the still, introducing steam at the bottom of the still so that the reaction begins at the bottom and gradually progresses throughout the mass, and preventing condensation of the steam within the still by maintaining by external means the temperature within the lower part of the still.

This specification signed and witnessed this 17th day of January A. D., 1911.

RALPH STOTT SWINTON.

Signed in the presence of—
Thos. L. Keough,
Walter H. Roll.